(12) United States Patent
Gelter et al.

(10) Patent No.: US 8,428,045 B2
(45) Date of Patent: Apr. 23, 2013

(54) MEDIA CLOCK RECOVERY

(75) Inventors: Aaron Gelter, West Jordan, UT (US); Brian Parker, West Valley City, UT (US); Robert Boatright, Sandy, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 377 days.

(21) Appl. No.: 12/874,836

(22) Filed: Sep. 2, 2010

(65) Prior Publication Data

US 2011/0228888 A1 Sep. 22, 2011

Related U.S. Application Data

(60) Provisional application No. 61/314,263, filed on Mar. 16, 2010.

(51) Int. Cl.
*H04W 64/00* (2009.01)
(52) U.S. Cl.
USPC ........... 370/350; 370/503; 370/507; 370/512; 370/516; 375/371; 375/376
(58) Field of Classification Search .................. 370/503, 370/350, 516, 498, 389, 507, 510, 512; 375/371, 375/376
See application file for complete search history.

(56) References Cited

U.S. PATENT DOCUMENTS

| | | | | |
|---|---|---|---|---|
| 5,566,180 A * | 10/1996 | Eidson et al. | ................ | 370/473 |
| 2003/0086442 A1 * | 5/2003 | Reynolds et al. | ............ | 370/503 |
| 2005/0036512 A1 * | 2/2005 | Loukianov | ................... | 370/469 |
| 2008/0019398 A1 | 1/2008 | Genossar et al. | ............ | 370/498 |
| 2010/0158183 A1 * | 6/2010 | Hadzic et al. | ................ | 375/376 |
| 2010/0162026 A1 * | 6/2010 | Gross et al. | ................... | 713/400 |
| 2011/0080985 A1 * | 4/2011 | Secker et al. | ................ | 375/376 |
| 2012/0060045 A1 * | 3/2012 | Foster | ........................ | 713/400 |

OTHER PUBLICATIONS

International Search Report, dated May 17, 2011, pp. 1-5, International Patent Application No. PCT/US2011/028328, European Patent Office, The Netherlands.

Written Opinion, dated May 17, 2011, pp. 1-9, International Patent Application No. PCT/US2011/028328, European Patent Office, The Netherlands.

Chae, Jong Kwon et al., Adaptive Inter-Media Synchronization for Multiple Session-based Uncompressed HD Media Transport, dated 2007, pp. 1-11, vol. 6777, SPIE.

Garner, Geoffrey et al., IEEE 802.1 AVB and Its Application in Carrier-Grade Ethernet, dated Dec. 2007, pp. 126-134, IEEE Communications Magazine.

(Continued)

*Primary Examiner* — Ricky Ngo
*Assistant Examiner* — Rasheed Gidado
(74) *Attorney, Agent, or Firm* — Brinks Hofer Gilson & Lione

(57) ABSTRACT

A system recovers a local media clock from a master media clock based on time-stamped packets received from a transmitter. The packets may include audio, video, or a combination of both, sampled at a rate determined by the master media clock at the transmitter. Timestamps in the packets may be based on values of a remote real-time counter at the transmitter that is synchronized with a local real-time counter at a receiver. The local media clock may be syntonized with the master media clock through the clock periods. The clocks may be synchronized by syntonizing the clocks and adjusting the phase of the local media clocks based on timestamps and a real-time counter.

18 Claims, 7 Drawing Sheets

OTHER PUBLICATIONS

Subrahmanyan, R., Timing Recovery for IEEE 1588 Applications in Telecommunications, dated Jun. 2009, pp. 1858-1868, vol. 58, No. 6, IEEE.

Han, Jiho et al., A Practical Implementation of IEEE 1588-2008 Transparent Clock for Distributed Measurement and Control Systems, dated Feb. 2010, pp. 433-439, vol. 59, No. 2, IEEE.

IEEE P1722™/D2.2 Draft Standard for Layer 2 Transport Protocol for Time Sensitive Applications in a Bridged Local Area Network, dated Mar. 2010, pp. 1-61, IEEE.

IEEE P1722™/D2.2 Draft Standard for Layer 2 Transport Protocol for Time Sensitive Applications in a Bridged Local Area Network, dated Sep. 2010, pp. 1-32, IEEE.

Boatright, Robert, Understanding IEEE's New Audio Video Bridging Standards, dated May 2009, pp. 1-5, Embedded Systems Design.

U.S. Appl. No. 13/024,016, Feb. 9, 2011, Gelter et al.

U.S. Appl. No. 13/024,008, Feb. 9, 2011, Gelter et al.

U.S. Appl. No. 13/023,989, Feb. 9, 2011, Gelter et al.

* cited by examiner

MEDIA CLOCK RECOVERY

PRIORITY CLAIM

This application claims priority under 35 U.S.C. §119(e) to U.S. Provisional Application No. 61/314,263, entitled "AUDIO/VIDEO PACKET MANAGEMENT SYSTEM," and filed Mar. 16, 2010, which is incorporated by reference.

BACKGROUND OF THE INVENTION

1. Technical Field

This application relates to media streams and, in particular, to the recovery of a media clock from time-stamped packets in media streams.

2. Related Art

Audio/video media streams may be transmitted from a transmitter to a receiver. A clock or counter at the receiver may be synchronized with a clock or counter at the transmitter through a clock synchronization protocol. Examples of clock synchronization protocols include IEEE (Institute of Electrical and Electronics Engineers) 1588:2002 Standard for a Precision Clock Synchronization Protocol for Networked Measurement and Control Systems, and IEEE 802.1AS Precision Time Protocol (PTP) in IEEE 802.1AS Standard for Local and Metropolitan Area Networks—Timing and Synchronization for Time-Sensitive Applications in Bridged Local Area Networks.

The clock synchronization protocol may include a protocol for exchanging messages between nodes to synchronize the clock at the receiver with the clock at the transmitter or with a clock at some other node. For example, PTP nodes may exchange Ethernet messages that synchronize the PTP nodes to a common time reference by providing clock master selection and negotiation mechanisms, link delay measurement and compensation, and clock rate matching and adjustment mechanisms. PTP provides a Best Master Clock Algorithm (BMCA), which is an algorithm for negotiating which of the clocks in the PTP nodes is to be the master clock. In particular, BMCA describes a negotiation and a signaling mechanism that identifies a grandmaster node. Once the grandmaster node is selected, synchronization may begin automatically between the grandmaster node and the other PTP nodes known as slave nodes. PTP messages transmitted from the grandmaster node, the slave nodes, or both, may include a timestamp value taken from a Real-Time Counter (RTC). The slave nodes may compare a value of the RTC of the slave nodes with a value of the RTC at the grandmaster node. By using link delay measurement and compensation techniques, the slave nodes may synchronize the RTC in each of the slave nodes with the RTC at the grandmaster node. Once the RTCs are synchronized with each other, periodic messages may provide information that enables the PTP rate matching adjustment algorithms. As a result, the PTP nodes may remain synchronized to a common time. However, the clock synchronization protocol does not perform media clock recovery.

SUMMARY

A system may recover a local media clock from a master media clock based on time-stamped packets received from a transmitter. The system may receive a media stream that was sampled at a rate determined by the master media clock at the transmitter. The system may include a frequency synthesizer, a local real-time counter, a period determination module, and a syntonization adjustment module. The frequency synthesizer may generate the local media clock. The local real-time counter may be synchronized with a remote real-time counter in the transmitter using a clock synchronization protocol. The period determination module may determine the period of the local media clock from a change in the local real-time counter over one or more cycles of the local media clock. The period determination module may also determine the period of the master media clock from the differences in timestamps included in the time-stamped packets. The syntonization adjustment module may cause the frequency synthesizer to adjust the frequency of the local media clock to match the frequency of the master media clock based on any difference between the period of the local media clock and the period of the master media clock.

The system may also include a synchronization adjustment module. The synchronization adjustment module may cause the frequency synthesizer to adjust the phase of the local media clock to match the phase of the master media clock. The synchronization adjustment module may determine the phase adjustment from a difference between a timestamp in a time-stamped packet and a value read from the local real-time counter when the synchronization adjustment module reads the timestamp of the time-stamped packet.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
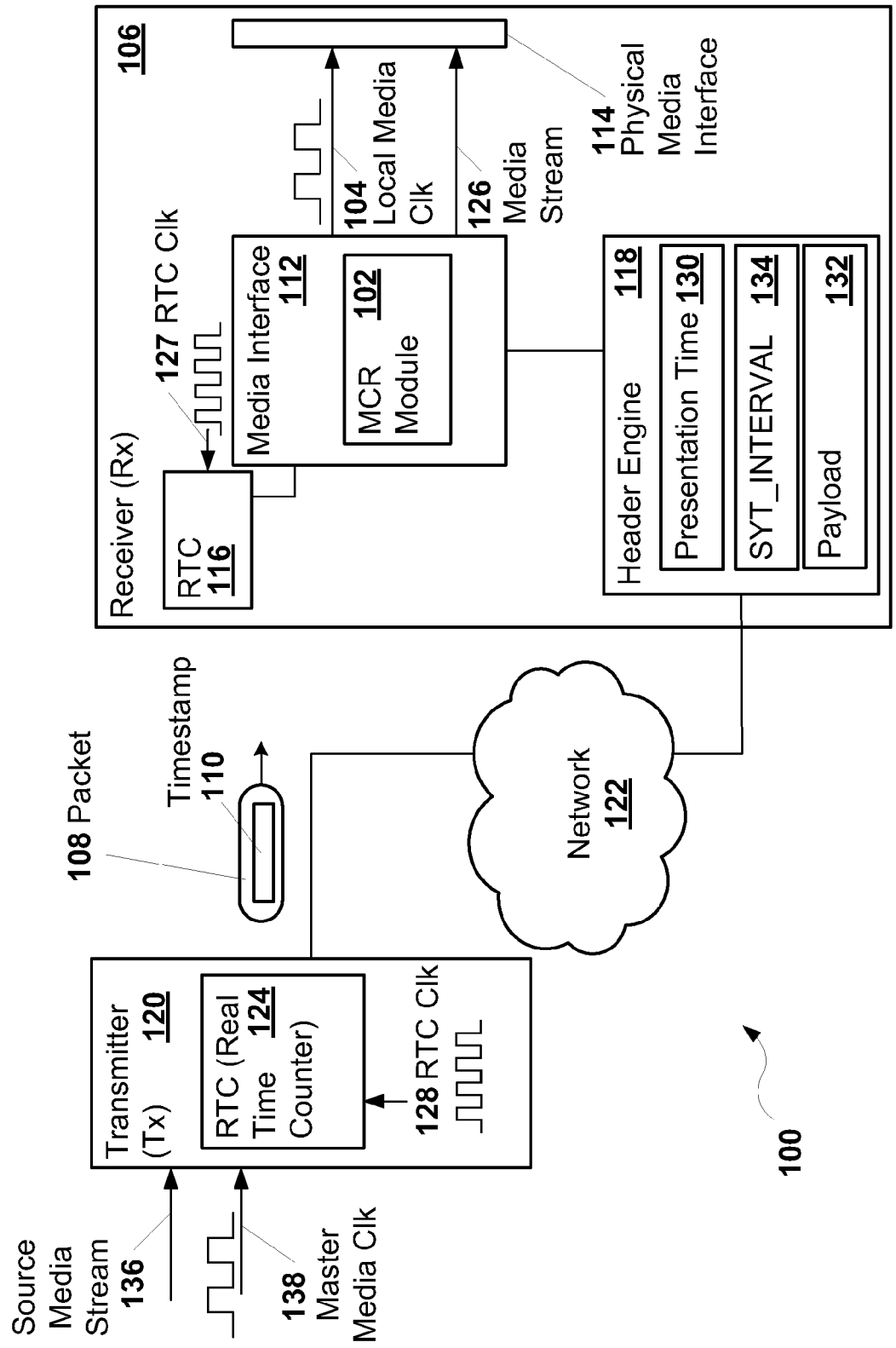
FIG. 1 illustrates an Audio/Video Packet Management System including a media clock recovery module that generates a local media clock.

A transmitter may be a device that transmits data over a network. The transmitter may include one or more elements that transmit a media stream over the network. For example, the transmitter may be a networked DVD (Digital Video Disc) player that transmits an audio/video stream. The receiver may receive and process the media stream transmitted by the transmitter. The receiver may include one or more elements that receive the media stream over the network. For example, the receiver may be a digital signal processor. A Real-Time Counter (RTC) at the transmitter and at the receiver may be controlled by a RTC clock at the transmitter and the receiver, respectively. A clock synchronization protocol may synchronize the RTCs and the RTC clocks. Prior to being transmitted by the transmitter to the receiver, an audio/video media stream may be provided to the transmitter at a rate associated with a master media clock. Because the master media clock and the RTC clock at the transmitter may be different from each other, the characteristics of the master media clock, such as frequency, may be different than the RTC clock. The receiver may provide both the recovered media stream and a local media clock to a consumer component or client of the media stream. The consumer component may read the media stream on an edge of the local media clock. In one example, the consumer component may include an I2S (Integrated Interchip Sound) compliant device that reads a word of sampled data from a set of data lines at a rate determined by a clock on a word clock line. The receiver may generate the local media clock on the word clock line and provide each word of the media stream on the set of data lines in compliance with the I2S standard. The receiver may generate the local media clock such that the local media clock at the receiver is synchronized with the master media clock at the transmitter.

The receiver may recover multiple media clocks. One receiver may receive audio/video media streams from multiple transmitters nearly simultaneously, where each one of the media streams is provided to the transmitters at a rate determined by a different one of the multiple media clocks. Each one of the media clocks may be different from the other media clocks. Each one of the media clocks may have different characteristics than the RTC clocks at the receivers. Alternatively or in addition, one receiver may receive multiple media streams from a single transmitter, where each of the multiple media streams is sampled at a different rate than the others because the multiple media streams are sampled at rates determined by multiple master media clocks. Alternatively or in addition, multiple media streams may be sampled at a single common rate.

A system may generate the local media clock at the receiver from time-stamped packets received from the transmitter. The local media clock may be generated with a frequency synthesizer, such as a Direct Digital Synthesizer (DDS). The period of the master media clock may be determined at the receiver based on a change in a first set of timestamps included in the time-stamped packets. The first set of timestamps may be values of the RTC at the transmitter sampled at a frequency determined by the master media clock. For example, the RTC at the transmitter may be sampled at a frequency equal to the frequency of the master media clock. The timestamps and sampled values of the media stream may be received at the transmitter in the time-stamped packets. The sampled values of the media stream may have been sampled at a rate determined by the master media clock. For example, the sampled values of the media stream may have been sampled at a frequency equal to the frequency of the master media clock. Each of the timestamps in the first set of timestamps may include a value of the RTC sampled as the transmitter prepared to send the packet that includes the timestamp. Each of the packets may include the timestamp and one or more sampled values of the media stream. For example, the transmitter may generate two packets, where each one of the packets includes a timestamp for the audio/video data included in that packet. The period may be calculated at the receiver as a difference between the two timestamps. The RTC at the receiver may be synchronized with the RTC at the transmitter using a clock synchronization protocol, such as PTP.

A second set of timestamps may be read from the RTC at the receiver by sampling the RTC on an edge of the local media clock, such as on a rising edge of the local media clock, a falling edge, or on both. A period of the local media clock may be determined based on a change in the second set of timestamps. The frequency of the local media clock may be adjusted with the frequency synthesizer to limit the difference between the period of the master media clock and the period of the local media clock. In other words, the local media clock may be syntonized with master media clock when the two clocks have the same frequency.

The phase difference between the master media clock and the local media clock may be determined by comparing one or more of the timestamps in the time-stamped packets with one or more corresponding timestamps read from the local RTC. If the master media clock and the local media clock are syntonized, then a difference between a timestamp in one of the packets and a value of the RTC in the receiver may indicate the extent of a phase shift between the master media clock and the local media clock. The difference between the timestamp in the packet and the value of the RTC, when divided by the period of the master media clock, may generate a remainder that indicates the phase difference between the master media clock and the local media clock. If the phase difference is below a threshold value, the clocks may be synchronized. The phase of the local media clock may be adjusted with the frequency synthesizer to limit the phase difference between the master media clock and the local media clock.

FIG. 1 illustrates an example of an Audio/Video Packet Management System (AVPM System) 100. The AVPM system 100 includes a MCR (media clock recovery) module 102 that generates a local media clock 104 at a receiver 106 from time-stamped packets 108. The MCR module 102 may be a unitary part of the receiver 106, or may be physically separate from, and in communication with, the receiver 106. Each one of the time-stamped packets 108 may include a timestamp 110.

In FIG. 1, the receiver 106 includes a media interface 112, a physical media interface 114, a local Real-Time Counter (RTC) 116, and a header engine 118. The media interface 112 may include the MCR module 102. Alternatively, the receiver 106 may include more, fewer, or different components. For example, the receiver 106 may not include the physical media interface 114.

The AVPM system 100 may include the receiver 106 and a transmitter 120. The AVPM system 100 may include more, fewer, or different components. For example, the AVPM system 100 may only include the receiver 106 with the local RTC 116 the MCR module 102, or only the local RTC 116 and the MCR module 102 without the receiver 106. The MCR module 102 may be any component that generates the local media clock 104 from the time-stamped packets 108 and the local RTC 116.

The local media clock 104 may be any periodic signal indicative of a sampling rate of data in a media stream 126. For example, the local media clock 104 may be a square wave, a pulse wave, a sinusoid, or any other suitable periodic wave form. The frequency of the local media clock 104 may be a multiple or fraction of the sampling rate of the data in the media stream 126. In one example, the frequency of the local media clock 104 may correspond to twice the sampling rate. In a second example, the frequency of the local media clock 104 may be an eighth of the sampling rate. In a third example, where the media stream 126 includes NTSC (National Television System Committee) video, the sampling rate may be a pixel clock rate of 27 MHz and the frequency of the local media clock 104 may be 15.734 kHz, sometimes referred to as the video line rate.

The receiver 106 may communicate with the transmitter 120 over a network 122. The transmitter 120 may include a remote Real-Time Counter (RTC) 124.

The receiver 106 may be a circuit, executable instructions retained on a non-transitory media, or combination that receives the time-stamped packets 108 from the transmitter 120. For example, the receiver 106 may be a circuit, an application specific integrated circuit (ASIC) or a field programmable gate array (FPGA). In one example, the receiver 106 may be a computer, a networking card, an audio digital signal processor, a video signal processor, or other device. The receiver 106 may be referred to as a listener.

The time-stamped packet 108 may be a data block that includes a timestamp 110. The time-stamped packet 108 may include at least a portion of the media stream 126. Alternatively or in addition, the time-stamped packet 108 may be a data block without any portion of the media stream 126, but that is received by the receiver 106 along with other packets that include at least a portion of the media stream 126. For example, the time-stamped packet 108 may include an IEEE P1722 packet.

The timestamp 110 may include a value read from the remote RTC 124 or a value derived from a value read from the remote RTC 124. The timestamp 110 may be dimensionless. For example, the timestamp 110 may be a value of an accumulator register included in the remote RTC 124. Alternatively, the timestamp 110 may include a unit of time. In one example, the timestamp 110 may be a sum of a value read from the remote RTC 124 and a delay value, where the delay value is indicative of a maximum transmission delay between the transmitter 120 and any receiver, such as the receiver 106.

The media interface 112 may be a circuit, executable instructions retained on a non-transitory media, or combination thereof that generates the media stream 126 on a per-media clock domain basis from the time-stamped packets 108. A media clock domain may be the sampling rate of data in a stream. The media clock domain may be 44.1 kilohertz, 48 kilohertz, 96 kilohertz, or 192 kilohertz, for example. The media interface 112 may provide the media stream 126 and the local media clock 104 to the physical media interface 114. Alternatively or in addition, the media interface 112 may provide a clock derived from the local media clock 104 to the physical media interface 114. In yet other alternative, the media interface 112 may provide the media stream 126 and the local media clock 104 directly to another component of the receiver 106 without the physical media interface 114.

The physical media interface 114 may include a physical transport medium that is electrically coupled to the media interface 112 for transporting the media stream 126 to a suitable component. Examples of the physical media interface 114 include an IxS (Time-Division Multiplexing) serial connection, an IEC (International Electrotechnical Commission) 60958 SPDIF interface, an MPEG2/4 (Moving Pictures Expert Group) interface, an interface for H.264 Transport Streams, an interface for Bt.601/656 raw video, an interface available from LINKPORT, which is a registered trademark of Compex, Inc. of Anaheim, Calif., or other tangible data transport components. Driver code in the physical media interface 114 may read data in the media stream 126, directly or indirectly, out of buffer memory in the media interface 112. The driver code may transmit the data in the media stream 126 to devices other than the receiver 106 and the transmitter 120, such as to a personal computer. The physical media interface 114 may propagate the local media clock 104, or a clock signal derived from the local media clock 104, to the other devices.

The receiver 106 may include multiple media interfaces 112 and multiple corresponding physical media interfaces 114. Each of the media interfaces 112 may include the MCR module 102 for the media clock domain applicable to that media interface 112. Consequently, the receiver 106 may receive multiple media streams from one or more transmitters 120 where at least one of the media streams is sampled at a different media clock domain than the other media streams. For example, one of the media streams may be sampled at about 44.1 kilohertz, while another one of the media streams may be sampled at about 192 kilohertz. One of the media interfaces 112 may provide the media stream 126 sampled at about 44.1 kilohertz, and a different one of the media interfaces 112 may provide the media stream 126 sampled at about 192 kilohertz. The MCR module 102 in each one of the media interfaces 112 may generate the local media clock 104 used by that media interface 112. The MCR module 102 in a first one of the media interfaces 112 may generate the first local media clock 104 at about 44.1 kilohertz and the MCR module 102 in a second one of the media interfaces 112 may generate the second local media clock 104 at 192 kilohertz. The media streams may or may not be related. Alternatively or in addition, the single MCR module 102 may generate the local media clock 104 for multiple media streams sampled at a common rate.

The local RTC 116 and the remote RTC 124 may be a counter that increases or decreases at a rate determined by a clock, such a RTC clock 127 at the receiver 106 and a RTC clock 128 at the transmitter 120. For example, the local RTC 116 and the remote RTC 124 may be implemented as accumulation registers, digital counters, real-time clock ICs (integrated circuits) or any other suitable devices. A digital counter may be any semiconductor device that counts the number of times a digital event has occurred. The digital event may be a rising or falling edge of the RTC clock 127 or 128, for example. The local RTC 116 and the remote RTC 124 may be synchronized using any known clock synchronization protocol.

The header engine 118 may be a circuit, executable instructions retained on a non-transitory media, or combination thereof that processes the time-stamped packets 108 received over the network 122 and extracts packet header information, such as the timestamp 110, from the time-stamped packets 108. The header engine 118 may also provide the payload 132 to other components of the receiver 106. The payload 132 may be a portion of the media stream 126 that is included in the time-stamped packets 108.

The timestamp 110 may be a presentation time 130. The presentation time 130 may be the time, according to the local RTC 116, at which the portion of the media stream 126 included in the payload 132 is to be presented to the physical media interface 114. In one example, the presentation time 130 may be the timestamp 110 included in the time-stamped packet 108. In a second example, the presentation time 130 may be the timestamp 110 plus a propagation delay value. In a third example, the presentation time 130 may be any other value derived from the timestamp 110 in the packet 108.

The header engine 118 may also determine the number of samples of the media stream 126 between timestamps, which is referred to as SYT_INTERVAL 134 or $I_{SYT}$. Each one of the time-stamped packets 108 may include multiple data blocks in the payload 132, where each one of the data blocks corresponds to a sample of the media stream 126. Additionally, a single one of the data blocks may include sampled values of more than one media streams, or channels, such as a sampled value of a left audio channel and a sampled value of a right audio channel. Each one of the data blocks may include a sampled value of each one of the media streams. In one example, each one of the time-stamped packets 108 may include only one timestamp 110 even though each one of the time-stamped packets 108 may include multiple samples of the media stream 126. Including one timestamp 110 for multiple samples or data blocks may be more efficient than including one timestamp 110 for each individual data block or sample. Thus, the SYT_INTERVAL 134 may be the number of data blocks in the payload 132 in some examples. In one example, a DBC (data block count) in an AVBTP (Audio/Video Bridging Transport Protocol) header may indicate how often AVBTP presentation timestamps are included in the time-stamped packets 108 as compared to the number of data blocks in the time-stamped packets 108, so the header engine 118 may set SYT_INTERVAL 134 to the DBC. In a second example, the SFC (Sampling Frequency Code) field of the FDF (Format Dependent Field) portion of the CIP (Common Isochronous Packet) header may provide the number of samples between timestamps in an IEEE P1722 packet, so the header engine 118 may set SYT_INTERVAL 134 to the SFC. In a third example, the SYT_INTERVAL 134 may be the value "1," because the timestamp 110 is included for each data block in the payload 132. In a forth example, the SYT_INTERVAL 134 may not be determined or used.

The transmitter 120 may be a circuit, executable instructions retained on a non-transitory media, or combination thereof that transmits the time-stamped packets 108 over the network 122. For example, the transmitter 120 may be a circuit, an application specific integrated circuit (ASIC) or a field programmable gate array (FPGA). Alternatively, the transmitter 120 may be a computer, a networking device for a computer, an audio digital signal processor, a video signal processor, or other device. The transmitter 120 may be referred to as a talker or a speaker.

The network 122 may be a communications network. For example, the network 122 may include a local area network (LAN), a wireless local area network (WLAN), a personal area network (PAN), a wide area network (WAN), the Internet, a combination thereof. The network 122 may support communications protocols that communicate the time-stamped packets 108 and other packets, such as those used by the clock synchronization protocol.

During operation of the AVPM system 100, the transmitter 120 and the receiver 106 may communicate with each other using the clock synchronization protocol. Based on the messages exchanged between the transmitter 120 and the receiver 106, the remote RTC 124 and the local RTC 116 may be synchronized.

The transmitter 120 may receive a source media stream 136 sampled in accordance with a master media clock 138. The transmitter 120 may generate one of the time-stamped packets 108 by reading a value of the remote RTC 124, adding a maximum delay, and storing the sum as the timestamp 110 in the packet 108. The transmitter 120 may store a portion of the source media stream 136 in the time-stamped packet 108 and may transmit the time-stamped packet 108 over the network 122. The transmitter 120 may repeat the process of reading the value of the remote RTC 124, generating the timestamp 110, storing the next portion of the source media stream 136, and transmitting the next one of the time-stamped packets 108 over the network 122. Through this process, the transmitter 120 may transmit the source media stream 136 to the receiver 106.

The header engine 118 may process the time-stamped packets 108. The header engine 118 may extract the timestamp 110 from each of the time-stamped packets 108. The header engine may pass the payload 132 from the time-stamped packets 108 to other components of the receiver 106, such as the media interface 112. The header engine 118 may provide the timestamp 110 or a derivation thereof to the media interface 112. The header engine 118 may provide the SYT_INTERVAL 134 to the media interface 112.

The MCR module 102 in the media interface 112 may perform media clock recovery by reading values of the local RTC 116 and processing the timestamp 110 and the SYT_INTERVAL 134 to generate the local media clock 104. The media interface 112 may provide the local media clock 104 and the media stream 126 to the physical media interface 114. Alternatively, the MCR module 102 may receive the time-stamped packets 108 or portions thereof, and communicate with the local RTC 116 through other components.

Figure 2:
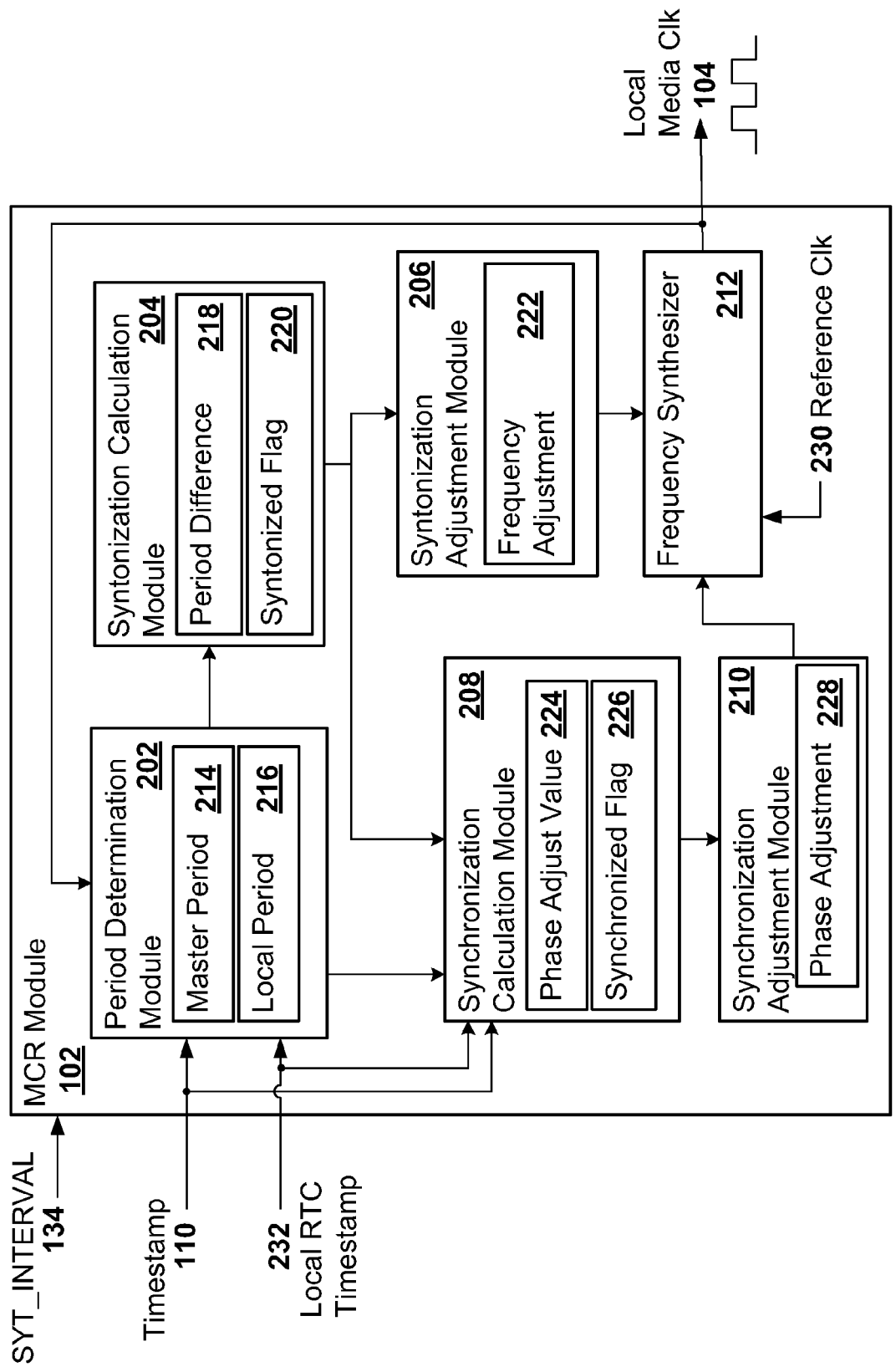
FIG. 2 illustrates an example media clock recovery module that generates a local media clock.

FIG. 2 illustrates the MCR module 102 that generates the local media clock 104. The MCR module 102 may include a period determination module 202, a syntonization calculation module 204, a syntonization adjustment module 206, a synchronization calculation module 208, a synchronization adjustment module 210, and a frequency synthesizer 212. Other MCR modules 102 may include more, fewer, or different components.

The period determination module 202 determines a master period 214 and a local period 216. The master period 214 may be the period of the master media clock 138 at the transmitter 120. The local period 216 is the period of the local media clock 104.

The syntonization calculation module 204 determines a period difference 218 and generates a syntonized flag 220. The period difference 218 may be the difference in the master period 214 and the local period 216. The syntonized flag 220 may indicate whether the master media clock 138 is syntonized with the local media clock 104.

The syntonization adjustment module 206 directs the frequency synthesizer 212 to adjust the frequency of the local media clock 104 in accordance with a frequency adjustment 222. The frequency adjustment 222 may be a value that the frequency synthesizer 212 accepts to adjust the frequency of the local media clock 104.

The synchronization calculation module 208 determines a phase adjust value 224 and a synchronized flag 226. The phase adjust value 224 may be any value indicating how the phase of the local media clock 104 may be modified in order to synchronize the local media clock 104 with the master media clock 138. The synchronized flag 226 indicates whether the local media clock 104 and the master media clock 138 are synchronized.

The synchronization adjustment module 210 directs the frequency synthesizer 212 to adjust the phase of the local media clock 104 in accordance with a phase adjustment 228. The phase adjustment 228 may be a value that the frequency synthesizer 212 accepts to adjust the phase of the local media clock 104. In one example, the phase adjustment 228 may be the phase adjust value 224. In a second example, the phase adjustment 228 may be derived from the phase adjust value 224, such as where the synchronization adjustment module 210 accepts frequency adjustments in a different format, such as an output frequency instead of an adjustment to the output frequency.

The frequency synthesizer 212 generates a range of frequencies to form an output signal, such as the local media clock 104, from a fixed time base or oscillator, such as a reference clock 230. The frequency synthesizer 212 may include a DDS (direct digital synthesizer), a Direct Analog Synthesis, a digital PLL (phase-locked loop) synthesizer such as an integer-N synthesizer and a fractional-N synthesizer, or another type of synthesizer. In one example implementation of the frequency synthesizer, the frequency synthesizer 212 may include a counter that wraps back to zero when saturated. Whenever a) the counter wraps, the level of the local media clock 104 may be toggled. The rate at which the counter wraps may be adjusted by varying an increment size used to increment the counter. For example, an increment size of 1 wraps much less often than an increment size of 100. Instead of varying the increment size, the value at which the counter wraps back to zero may be varied while maintaining a constant increment size. The counter may be driven by the reference clock 230, which controls when the counter increments. The frequency synthesizer 212 may adjust the phase and frequency of the local media clock 104 based on input values. The frequency synthesizer 212 may, for example, execute Taylor Series correction algorithms to bring the spurious free dynamic range (SFDR) to at least 150 decibels and, as a result, minimize output jitter.

The frequency synthesizer 212 may accept the frequency adjustment 222 as an input value. In response, the frequency synthesizer 212 may produce a constant frequency signal, such as the local media clock 104, based on the frequency adjustment 222. If the frequency synthesizer 212 is a DDS, the equation for calculating the frequency adjustment 222, M, for the DDS may be, for example:

$$M = 2^n (T_{ref}/T_{out})$$

where n is the number of bits in an accumulator that holds the frequency adjustment 222, $T_{ref}$ is the period of the reference clock 230, and $T_{out}$ is the desired output period. Frequency is the number of occurrences of a repeating event per unit time. The period is the duration of one cycle in a repeating event, so the period is the reciprocal of the frequency. In terms of the frequency of the local media clock 104, $f_{out}$, and the frequency of the reference clock 230, $f_{ref}$ may be expressed as $$f_{out} = (f_{ref} * M)/2^n$$

where n is the number of bits in an accumulator that holds the frequency adjustment 222, M. The frequency of the local media clock 104, $f_{out}$, may be expressed as the frequency adjustment 222, M, multiplied by the reference frequency, $f_{ref}$, divided by $2^n$. In one example, if the frequency of the reference clock 230 is 125 MHz and n is 48, then the frequency resolution of the DDS is 0.000000444 Hz, which is 125 Mhz divided by $2^n$. Thus, M may be selected so that the frequency of the local media clock 104, $f_{out}$, matches any target frequency.

In addition to the frequency adjustment 222, the frequency synthesizer 212 may accept the phase adjustment 228 as an input value. The frequency synthesizer 212 may adjust the phase of the local media clock 104 based on the phase adjustment 228. If the frequency adjustment 222 is increased, then the frequency synthesizer 212 may shift the phase of the local media clock 104 in one direction. In contrast, if the frequency adjustment 222 is decreased, then the frequency synthesizer 212 may shift the phase in the other direction.

During operation of the MCR module 102, the MCR module 102 may sequentially receive SYT_INTERVAL 134 and the timestamp 110 for each of the time-stamped packets 108. The MCR module 102 may receive SYT_INTERVAL 134 and the timestamp 110 from the header engine 118. Alternatively, the MCR module 102 may sequentially receive the timestamp 110 for each of the time-stamped packets 108 without receiving SYT_INTERVAL 134.

The period determination module 202 may determine the master period 214 by comparing the timestamp 110 with the timestamp 110 in a previously received time-stamped packet 108. The period determination module 202 may subtract the timestamps 110 to determine the elapsed time between the packets 108 as a change in the remote RTC 124. If only one sample of the source media stream 136 is included in each of the time-stamped packets, then the elapsed time between the packets 108 may be the period 214 of the master media clock 138. If there is one timestamp 110 and SYT_INTERVAL 134 samples in each of the time-stamped packets 108, then the period 214 of the master media clock 138 may be the elapsed time divided by SYT_INTERVAL 134. The period determination module 202 may average the change in timestamps, filter the change in timestamps, or otherwise process the change in timestamps in order to calculate the master period 214.

In one example, the frequency of the master media clock 138, $f_S$, may be expressed as a function of timestamps:

$$f_S = [(t_B - t_A) * 10^{-9}/SYT\_INTERVAL]^{-1} = [SYT\_INTERVAL/(t_B - t_A)] * 10^9$$

where $t_A$ is the timestamp in a first one of the time-stamped packets 108 and $t_B$ is the timestamp in a second one of the time-stamped packets 108. For example, the frequency of the master media clock 138 may be $8/(3A48A250_{16} - 3A461750_{16}) * 10^9$, which is about 48,003.07 Hz, where SYT_INTERVAL is 8, $t_B$ is $3A48A250_{16}$ nanoseconds, and $t_A$ is $3A461750_{16}$ nanoseconds.

In addition to the master period 214, the period determination module 202 may determine the local period 216. The period determination module 202 may read a local RTC timestamp 232 from the local RTC 116 in response to detecting a rising edge of the local media clock 104, a falling edge of the local media clock 104, or a combination of both. The period determination module 202 may subtract the sampled local RTC timestamps 232 to determine the elapsed time between samples as a change in the local RTC 116. The period determination module 202 may average the change in timestamps, filter the change in timestamps, or otherwise process the change in timestamps in order to calculate the period 216 of the local media clock 104 over time.

The syntonization calculation module 204 may receive the master period 214 and the local period 216 from the period determination module 202. The syntonization calculation module 204 may determine the period difference 218. The period difference 218 may be the master period 214 subtracted from the local period 216. The syntonization calculation module 204 may average, filter, or otherwise process the difference between the master period 214 and the local period 216 in order to determine the period difference 218.

The syntonization calculation module 204 may determine the syntonized flag 220 based on the period difference 218. If the absolute value of the period difference 218 is zero or about zero or less than a threshold value, then the syntonized flag 220 may indicate that the local media clock 104 is syntonized with the master media clock 138. In contrast, if the absolute value of the period difference 218 is greater than a threshold value, then the syntonized flag 220 may indicate that the local media clock 104 is not syntonized with the master media clock 138.

If the syntonized flag 220 indicates that the local and master media clocks 104 and 138 are not syntonized, then the syntonization adjustment module 206 may increment or decrement the frequency adjustment 222, M, as described above, so that the frequency of the local media clock 104, $f_{out}$, is closer to the frequency of the master media clock 138, $f_S$. The syntonization adjustment module 206 may communicate the frequency adjustment 222 to the frequency synthesizer 212.

The described process may be repeated until the local and master media clocks 104 and 138 are syntonized. The period determination module 202 may re-calculate the periods 214 and 216, the syntonization calculation module 204 may set the syntonized flag 220 accordingly, and the syntonization adjustment module 206 may re-determine and re-transmit the frequency adjustment 222 to the frequency synthesizer 212, until the syntonized flag 220 indicates the master and local media clocks 104 and 138 are syntonized. The process may be repeated multiple times because of lost packets or other abnormalities causing variations in the determination of the periods 214 and 216. One such abnormality includes round-off errors due to limitations in the accuracy of the timestamp 110. The described process may continue even after the local and master media clocks 104 and 138 are syntonized If the syntonized flag 220 indicates that the local media clocks 104 and 138 are syntonized, then the synchronization calculation module 208 may determine whether the master and local media clocks 104 and 138 are synchronized. The synchronization calculation module 208 may set the synchronized flag 226 accordingly. The synchronization calculation module 208 may receive the local period 216, the master period 214, or both from the period determination module 202. When the master and local media clocks 104 and 138 are syntonized, then the local period 216 and the master period 214 may be the same value: a syntonized period. For example, the syntonized period may be the local period 216, the master period 214, or derived from both, such as a sum of the local period 216 and the master period 214 divided by two.

The timestamp 110 received in the time-stamped packet 108 may be the presentation time 130. If so, when the receiver 106 receives the time-stamped packet 108, the presentation time 130 will likely be greater than the local RTC timestamp 232 read from the local RTC 116. In particular, the presentation time 130 may be many multiples of the syntonized period greater than the local RTC timestamp 232. Therefore, the difference between the presentation time 130 and the local RTC timestamp 232 may be divided by the syntonized period to determine a phase difference between the master media clock 138 and the local media clock 104. The phase difference may be the remainder of the difference between the presentation time 130 and the local RTC timestamp 232 divided by the syntonized period. The synchronization calculation module 208 may determine the phase adjust value 224 to be the phase difference. If the phase adjust value 224 is about zero or a value less than a threshold value, then the synchronization calculation module 208 may determine that the master and local media clocks 104 and 138 are synchronized and set the synchronized flag 226 accordingly.

If the synchronized flag 226 indicates that the master and local media clocks 104 and 138 are not synchronized, then the synchronization adjustment module 210 may determine the phase adjustment 228 from the phase adjust value 224 received from the synchronization calculation module 208. The synchronization adjustment module 210 may communicate the phase adjustment 228 to the frequency synthesizer 212. In response, the frequency synthesizer 212 may adjust the phase of the local media clock 104. The period determination module 202, the syntonization calculation module 204, the syntonization adjustment module 206, the synchronization calculation module 208 and the synchronization adjustment modules 210 may repeat the above described operations until the local and master media clocks 104 and 138 are synchronized.

Even after the local and master media clocks 104 and 138 are synchronized, the process may continue indefinitely. If the local and master media clocks 104 and 138 are synchronized, then no further adjustments are made. Nevertheless, because of inaccuracies, such as clock drift, round-off error, non-exact period matching, and other abnormalities, the local and master media clocks 104 and 138 may eventually stray from each other, so continuing the process indefinitely facilitates updating the local media clock 104 to match the master media clock 138 to compensate for the inaccuracies.

Due to the feedback nature of the system 100, large sweeping adjustments may cause the control system to become unstable. Accordingly, relatively small adjustments may made to bring the local media clock 104 closer to the desired frequency, which may result in a gradual convergence to the desired frequency. Because a large initial error may cause the system 100 to take a relatively long time to converge on the desired frequency using relatively small adjustments, a tiered approach may be used. Accordingly, if the initial error is large, then a large coarse adjustment may be made. As the errors get smaller, the adjustment may become smaller.

Figure 3:
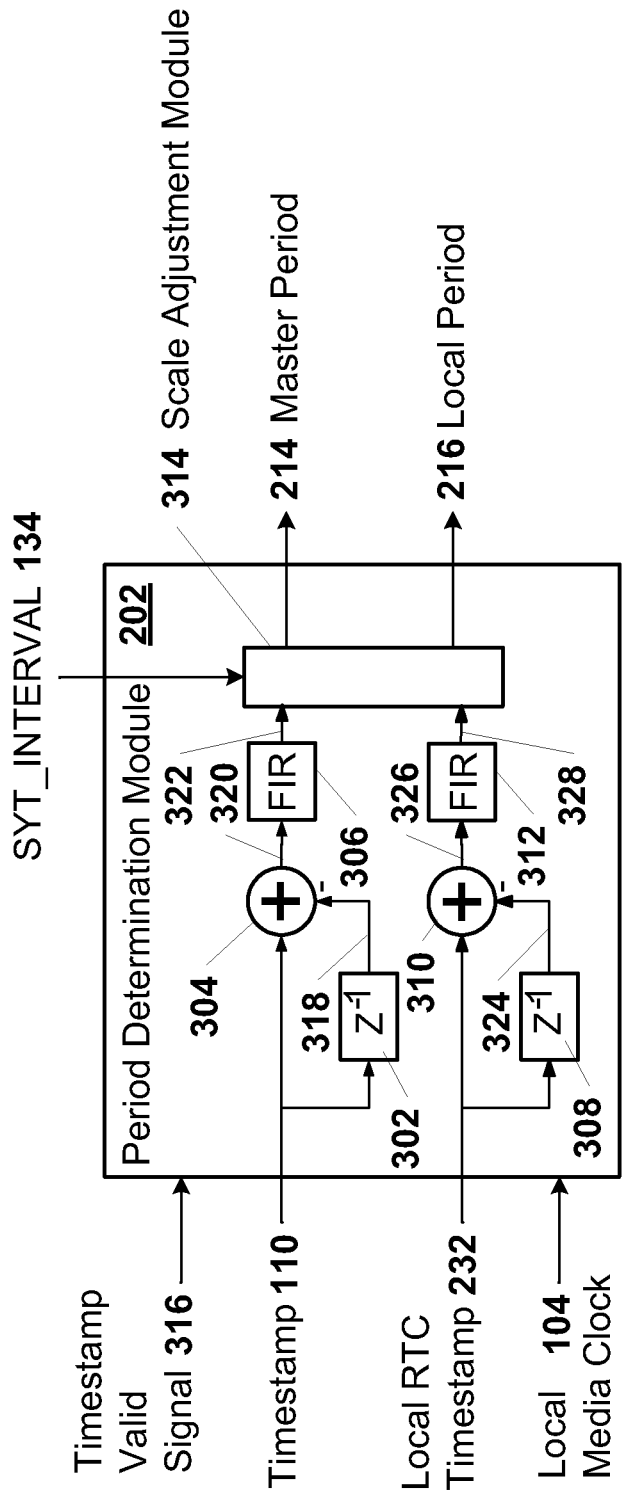
FIG. 3 illustrates a period determination module.

FIG. 3 illustrates an example of the period determination module 202. The period determination module 202 may include a packet timestamp delay 302, a packet timestamp adder 304, a packet timestamp FIR (finite impulse response) filter 306, a local timestamp delay 308, a local timestamp adder 310, a local timestamp FIR filter 312, and a scale adjustment module 314. The period determination module 202 may include more, fewer, or different components. For example, the period determination module 202 may not include the scale adjustment module 314. In yet another example, the period determination module 202 may not include the packet timestamp FIR filter 306 and the local timestamp FIR filter 312.

The packet timestamp delay 302 or the local timestamp delay 308 may include any component that outputs a previous input value. The packet timestamp and the local timestamp delays 302 and 308 may delay a fixed amount of time. The packet timestamp and the local timestamp delays 302 and 308 may be, for example, a buffer component controlled by a signal, such that on the rising or falling edge of the signal, the buffer reads an input value and outputs an output value equal to the input value read N cycles of the signal ago. The signal for the packet timestamp delay 302 may be a timestamp valid signal 316 indicating the period determination module 202 is to process the timestamp 110 recently received in the time-stamped packet 108. The header engine 118 may cause the timestamp valid signal 316 to rise as each one of the time-stamped packets 108 is processed and to fall between processing of the time-stamped packets 108. Alternatively, a different component of the receiver 106 may generate the timestamp valid signal 316. For example, a stream identifier filter may generate the timestamp valid signal 316 in response to determining that a stream id in the packet 108 identifies a stream that the receiver 106 is receiving. The signal for the local timestamp delay 308 may be the local media clock 104. Examples of the delays 302 and 308 include a delay element described in HDL (hardware description language) and implemented in a FPGA (field programmable gate array), a semiconductor buffer element, and executable instructions stored in computer-readable storage media.

The packet timestamp adder 304 or the local timestamp adder 310 may include any component that outputs a difference between two inputs. The adders 304 and 310 may include an adder element described in HDL and implemented in a FPGA, a semiconductor buffer element, and instructions executable by a processor.

The packet timestamp FIR filter 306 or local timestamp FIR filter 312 may include hardware and/or software that selectively passes certain elements of a signal while eliminating or compensating others. The FIR filters 306 and 312 may be weighted average filters. The FIR filters 306 and 312 may average the last N timestamp deltas (change in timestamps) thereby filtering anomalous input timestamp deltas or limiting the effect of anomalous input timestamp deltas. The packet timestamp FIR filter 306 may be a standard 256-tap filter, and the local timestamp FIR filter 312 may be a standard 32-tap filter. The packet timestamp FIR filter 306 and the local timestamp FIR filter 312 may be of different orders and be a different type of filter. The FIR filters 306 and 312 may include a filter element described in HDL and implemented in a FPGA, a semiconductor buffer element, an off-the shelf discrete component, and executable instructions retained in a computer readable media.

The scale adjustment module 314 may include hardware and/or software that adjust outputs of the FIR filters 306 and 312 so that the master period 214 and the local period 216 are at the same scale. For example, the scale adjustment module 314 may compensate for SYT_INTERVAL 134 being non-zero. The scale adjustment module 314 may divide the output of the packet timestamp FIR filter 306 by SYT_INTERVAL 134. Alternatively, the scale adjustment module 314 may multiply the output of the local timestamp FIR filter 312 by SYT_INTERVAL 134. Alternatively or in addition, the scale adjustment module 314 may adjust for differences in a delay of the packet timestamp delay 302 and a delay of the local timestamp delay 308. If the local timestamp delay 308 buffers a value for N cycles of the local media clock 104, then the scale adjustment module 314 may divide the output of the local timestamp FIR filter 312 by N. Alternatively or in addition, the scale adjustment module 314 may convert between internal number formats for implementation reasons, such as between floating point and fixed scale. The scale adjustment module 314 may include components described in HDL and implemented in a FPGA, an application specific integrated circuit (ASIC), and executable instructions retained in a computer readable media.

During operation of the period determination module 202, the period determination module 202 may receive the timestamp valid signal 316, the timestamps 110 in the time-stamped packets 108, SYT_INTERVAL 134, the local RTC timestamps 232, and the local media clock 104 as inputs. The period determination module 202 may generate the master period 214 and the local period 216 from these inputs.

The period determination module 202 may wait for the timestamp valid signal 316 to indicate that the timestamp 110 from the time-stamped packet 108 may be processed. For example, the packet timestamp delay 302 and the packet timestamp FIR 306 may be clocked by the timestamp valid signal 316.

In response to the timestamp valid signal 316 indicating that the timestamp 100 is valid, the packet timestamp delay 302 may store the current timestamp 110, TS, and output an old timestamp 318, $TS_{old}$, which was previously received as an input to the packet timestamp delay 302. The packet timestamp adder 304 may determine a raw period 320, $T_{raw}$, of the master media clock 138 by subtracting the old timestamp 318, $TS_{old}$ from the current timestamp 110, TS. In one example, the raw period 320, $T_{raw}$, may be the master period 214 multiplied by SYT_INTERVAL 134.

In response to the timestamp valid signal 316 indicating that the timestamp 100 is valid, the packet timestamp FIR filter 306 may sum the raw period 320 with previously generated raw periods and output an average raw period 322 of the master media clock 138. The packet timestamp FIR filter 306 may be a 256-tap FIR filter with constant coefficients that sums the last 256 raw period values 320 generated by the packet timestamp adder 304. The 256-tap FIR filter may thereby generate a fixed-point average raw period 322 with eight binary bits of fractional precision. The packet timestamp FIR filter 306 may be of a different order and be configured differently.

The period determination module 202 may determine the local period 216 of the local media clock 104 in response to detecting a falling edge, a rising edge, or both of the local media clock 104. The local timestamp delay 308 and the local timestamp FIR filter 312 may be clocked by the local media clock 104. The local timestamp delay 308 may read the current local RTC timestamp 232 from the local RTC 116 and output an old RTC timestamp 324, $RTC_{old}$, in response to detecting a falling edge of the local media clock 104. The local timestamp adder 310 may determine a raw period 326, $T_{raw}$, of the local media clock 104 by subtracting the old RTC timestamp 324 from the current local RTC timestamp 232. Also, in response to detecting the falling edge of the local media clock 104, the local timestamp FIR filter 312 may sum the raw period 326 with previously generated raw periods to output an average raw period 328 of the master media clock 138. The local timestamp FIR filter 312 may be a 32-tap FIR filter with constant coefficients. After calculating 32 raw period values, the 32-tap FIR filter may generate the average raw period 328 of the local media clock 104 as a fixed-point average with five binary bits of fractional precision. The local timestamp FIR filter 312 may be of a different order or be configured differently.

The order of the local timestamp FIR filter 312 may be less than the order of the packet timestamp FIR filter 306. For example, the order of the local timestamp FIR filter 312 may be 32 and the order of the packet timestamp FIR filter 306 may be 256. The lower order local timestamp FIR filter 312 may limit the number of raw period values summed. Thus, the local timestamp FIR filter 312 may respond quickly to adjustments in frequency or phase made by the frequency synthesizer 212. As a result, however, some precision may be lost when calculating the local period 216 as compared with calculating the master period 214.

The scale adjustment module 314 may adjust the average raw period 322 of the master media clock 138 and the average raw period 328 of the local media clock 104 so that the master period 214 and the local period 216 are at the same scale. The scale adjustment module 314 may divide the average raw period 322 of the master media clock 138 by SYT_INTERVAL 134 to determine at the master period 214.

Figure 4:
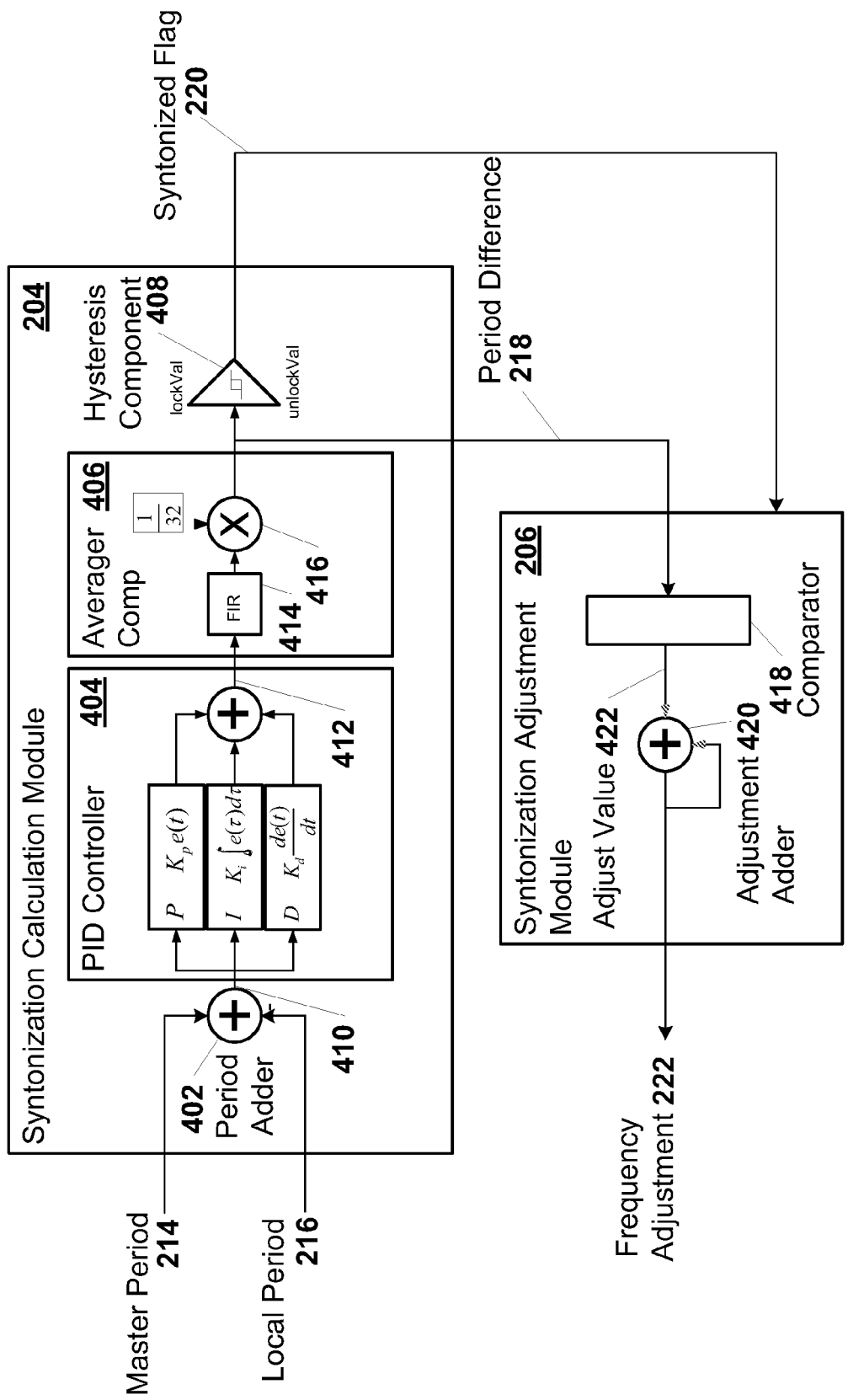
FIG. 4 illustrates a syntonization calculation module and a syntonization adjustment module.

FIG. 4 illustrates an example of the syntonization calculation module 204 and the syntonization adjustment module 206. The syntonization calculation module 204 may include a period adder 402, a PID (proportional integral derivative) controller 404, an averager component 406, and a hysteresis component 408. Alternatively, the syntonization calculation module 204 may include more, fewer, or different components. For example, the syntonization calculation module 204 may not include the averager component 406.

The period adder 402 may include hardware and/or software that calculates a difference between two inputs. The period adder 402 may determine a difference 410 between the master period 214 and the local period 216.

The PID controller 404 may be a control loop feedback controller. The PID controller may be tuned by, for example, three separate parameters: a proportional value, an integral value, and a derivative value, denoted P, I, and D, respectively. The proportional value may determine the reaction to a current error, the integral value may determine the reaction based on the sum of recent errors, and the derivative value may determine the reaction based on the rate at which the error has been changing. The error may be the difference 410 between the master period 214 and the local period 216. The weighted sum 412 of these three values may ultimately be used to adjust the frequency of the local media clock 104.

The averager component 406 may include hardware and/or software that averages an input value. The averager component 406 may average the weighted sum 412 generated by the PID controller 404. The averager component 406 may include, for example, an N-order FIR filter 414 that sums the weighted sums 412 generated by the PID controller 404 over N cycles of a clock that controls the averager component 406. The clock that controls the averager component 406 may be the local media clock 104. In an alternative example, the clock that controls the average component 406 may be the timestamp valid signal 316. Alternatively, the clock that controls the average component 406 may be unrelated to the timestamp valid signal 316 and the local and master media clocks 104 and 138. The N-order FIR filter 414 may be a 32-tap filter or any other suitable order. The averager component 406 may also include a division component 416 that divides the output of the N-order FIR filter 414 by N in order to calculate the average of the weighted sums 412 generated by the PID controller 404. The average of the weighted sums 412 generated by the PID controller 404 may be the period difference 218 generated by the syntonization calculation module 204. Alternatively, the N-order FIR filter 414 may determine the period difference 218 without the division component 416.

The hysteresis component 408 may include hardware and/or software that converts a numerical number input into a Boolean output based on hysteresis. If the Boolean output is y and the input is u, then y may be determined as follows: y=false if y=true and u<=$u_{low}$; y=true if y=false and u>=$u_{high}$; and y=$y_{previous}$ otherwise. The values $u_{low}$ and $u_{high}$ are threshold values.

During operation of the syntonization calculation module 204, the syntonization calculation module 204 may determine the period difference 218 and the syntonized flag 220. The period adder 402 may determine the difference 410 between the master period 214 and the local period 216. The difference 410 between the master period 214 and the local period 216 represents a measurement of error in the local period 216, because the master period 214 and the local period 216 are ideally the same when the master media clock 138 is syntonized with the local media clock 104.

The PID controller 404 may reduce overshoot or other effects of adjusting the frequency of the local media clock 104. In particular, the PID controller 404 may generate the PID values from the difference 410 between the master period 214 and the local period 216, and determine the weighted sum 412 of the PID values. The averager component 406 may determine the period difference 218 from the weighted sum 412 of the PID values, further reducing the effect of anomalous differences 410 between the master period 214 and the local period 216.

The hysteresis component 408 may receive the period difference 218 from the averager component 406. The hysteresis component 408 may generate the syntonized flag 220 from the period difference 218.

The syntonization adjustment module 206 may include a comparator 418 and an adjustment adder 420. Alternatively, the syntonization adjustment module 206 may include more, fewer, or different components. For example, syntonization adjustment module 206 may not include the adjustment adder 420.

The comparator 418 may be hardware and/or software that compares two inputs and generates an output to indicate which of the inputs is larger. For example, the comparator 418 may be an operational amplifier configured as a comparator.

The adjustment adder 420 may include hardware and/or software that sums two inputs. For example, the adjustment adder 420 may be an accumulator register.

During operation of the syntonization adjustment module 206, the syntonization adjustment module 206 may receive the period difference 218 and the syntonized flag 220 from the syntonization calculation module 204, determine the frequency adjustment 222, and transmit the frequency adjustment 222 to the frequency synthesizer 212.

If the syntonized flag 220 indicates that the local media clock 104 is syntonized with the master media clock 138, then the syntonization adjustment module 206 may not transmit the frequency adjustment 222 to the frequency synthesizer 212. However, if the syntonized flag 220 indicates that the local media clock 104 is not syntonized with the master media clock 138, then the syntonization adjustment module 206 may determine and transmit the frequency adjustment 222 to the frequency synthesizer 212.

The comparator 418 may compare the period difference 218 with a zero reference or some other threshold value. The comparator 418 may then output an adjust value 422 that is either a positive or negative number depending on comparison. The adjust value 422 may therefore indicate whether the frequency of the local media clock 104 should increase or decrease, and by how much.

If the frequency adjustment 222 is a value that indicates at what frequency the frequency synthesizer 212 should generate the local media clock 104, then the adjustment adder 420 may add the adjust value 422 to the frequency adjustment 222 last transmitted to the frequency synthesizer 212 to obtain the frequency adjustment 222. Alternatively, if the frequency adjustment 222 is a value that indicates how much the frequency of the local media clock 104 should change, then the syntonization adjustment module 206 may set the frequency adjustment 222 to the adjust value 422.

Figure 5:
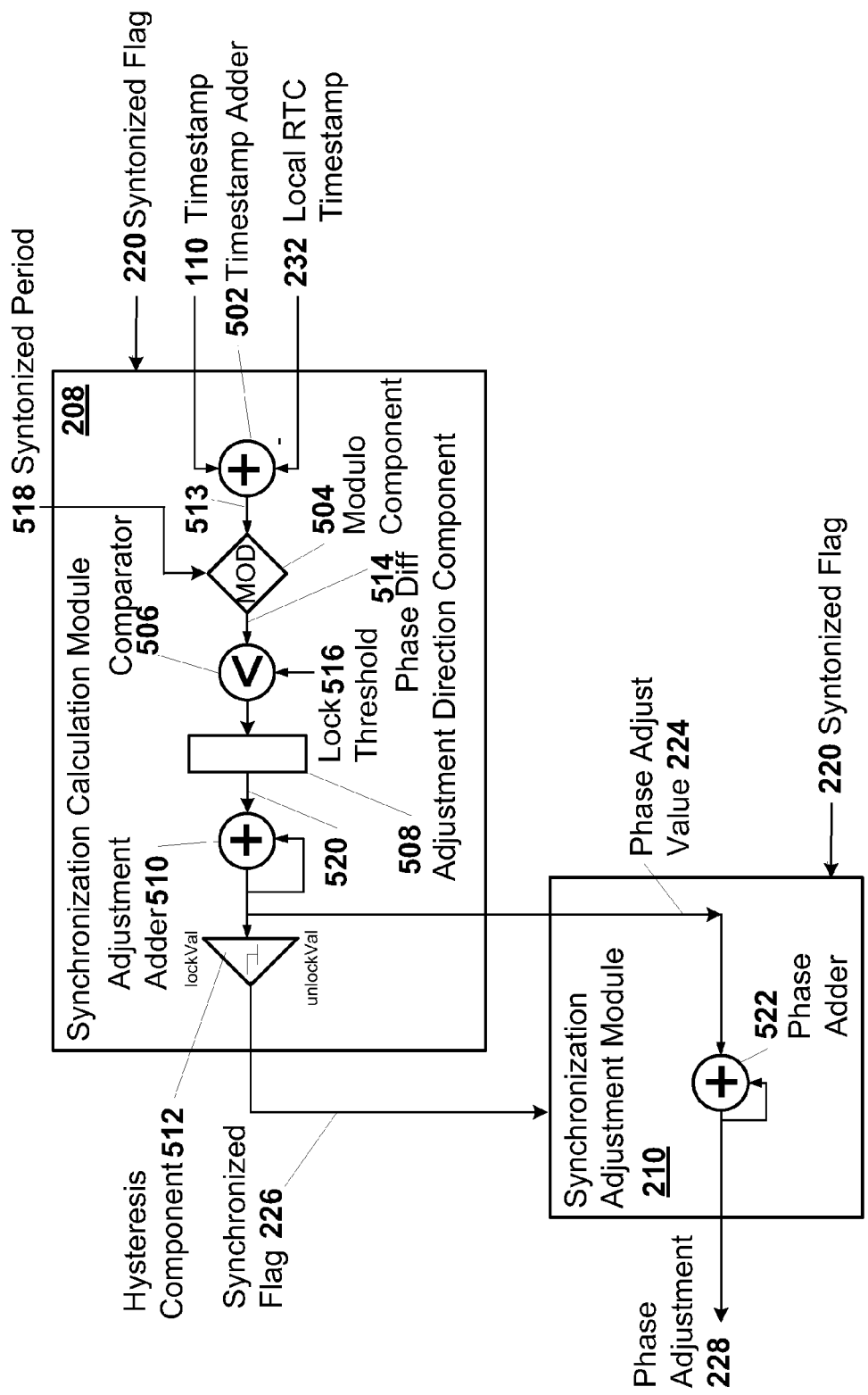
FIG. 5 illustrates a synchronization calculation module and a synchronization adjustment module.

FIG. 5 illustrates an example of the synchronization calculation module 208 and the synchronization adjustment module 210. The synchronization calculation module 208 may include a timestamp adder 502, a modulo component 504, a comparator 506, an adjustment direction component 508, an adjustment adder 510, and a hysteresis component 512. Alternatively, the synchronization calculation module 208 may include more, fewer, or different components.

The timestamp adder 502 may include hardware and/or software that determines a difference between two inputs and outputs the difference. The timestamp adder 502 may output a timestamp difference 513 that is a difference between the timestamp 110 of the time-stamped packet 108 and the local RTC timestamp 232.

The modulo component 504 may include hardware and/or software that outputs the remainder of a division of one input value by another input value. The modulo component 504 may output a phase difference 514 between the local media clock 104 and the master media clock 138 as the remainder of the timestamp difference 513 divided by the syntonized period 518. The syntonized period 518 may be the master period 214 or the local period 216, which are substantially the same value when the local media clock 104 is syntonized with the master media clock 138.

The comparator 506 may include hardware and/or software that compares two input values and determines whether one is greater than the other. The comparator 506 may compare a lock threshold 516 with the phase difference 514 between the local media clock 104 and the master media clock 138 to determine which is greater than the other. The lock threshold 516 may be any value less than a period of the local media clock 104. For example, the lock threshold 516 may be the syntonized period 518 divided by two, or any other suitable value.

The adjustment direction component 508 may include hardware and/or software that generates a negative value if a Boolean input is true and a positive value if the Boolean input is false. The adjustment direction component 508 may generate the negative value as an adjustment direction 520 if the comparator 506 indicates the phase difference 514 is less than the lock threshold 516, such as half of the syntonized period 518, and generate the positive value as the adjustment direction 520 otherwise. The adjustment direction 520 may be any value indicating a direction the phase of the local media clock 104 is to be adjusted. For example, the adjustment direction 520 may be one or negative one.

The adjustment adder 510 may include hardware and/or software that sums two input values. The adjustment adder 510 may update the phase adjustment value 224 by adding the adjustment direction 520 or any predetermined constant to the phase adjustment value 224. The phase adjustment may not be applied if the modulo component 504 outputs a zero result. If the modulo component 504 outputs a zero result, then the local and master media clocks 104 and 138 are in phase and no adjustment is needed. If non-zero, an adjustment may be made in a direction that brings the local and master media clocks 104 and 138 more in phase with each other. The phase adjust value 224 may initially be set to zero because no phase adjustment in either direction has occurred.

The hysteresis component 512 may include hardware and/or software that converts a numerical number input into a Boolean output based on hysteresis. For example, if the Boolean output is y and the input is u, then y may be determined as follows: y=false if y=true and u<=$u_{low}$; y=true if y=false and u>=$u_{high}$; and y=$y_{previous}$ otherwise. The values $u_{low}$ and $u_{high}$ are threshold values. The Boolean output of the hysteresis component 512 may be the synchronized flag 226 and the input of the hysteresis component 512 may be the phase adjust value 224.

The synchronization adjustment module 210 may include a phase adder 522. Alternatively, the synchronization adjustment module 210 may include more, fewer, or different components. For example, the synchronization adjustment module 210 may include multiple phase adders 522, one for each local media clock 104.

The phase adder 522 may include hardware and/or software that sums two input values. The phase adder 522 may sum the phase adjust value 224 and the current phase adjustment 228 and output the phase adjustment 228.

During operation of the synchronization calculation module 208, the synchronization calculation module 208 may wait until the syntonized flag 220 indicates that the local media clock 104 is syntonized with the master media clock 138 before determining the synchronized flag 226 and the phase adjust value 224. Alternatively, the synchronization calculation module 208 may determine the synchronized flag 226 and the phase adjust value 224 regardless of whether the syntonized flag 220 indicates the local media clock 104 is syntonized with the master media clock 138. In one example, the synchronization calculation module 208 may be clocked by the local media clock, the timestamp valid signal 316, or any other suitable signal. In a second example, the synchronization calculation module may be executed by a processor in response to an interrupt.

Due to the clock synchronization protocol, the remote RTC 124 and the local RTC 116 may have substantially the same value. If the timestamp 110 is the presentation time 130 described above, then the timestamp 110 in the packet 108 may be far ahead of the local RTC timestamp 232 read from the local RTC 116 when the packet 108 is processed. The modulo component 504 may determine the phase difference 514 as mod(Y−X, T), where Y is the timestamp 110 in the time-stamped packet 108 generated based on a value read from the remote RTC 124 on an edge of the master media clock 138; X is the local RTC timestamp 232 read from the local RTC 116 on an edge of the local media clock 104; T is the syntonized period 518; and mod() is the modulo operator. Because the periods of the master and local media clocks 138 and 104 have been made the same, the modulo operator may remove any full cycles of the master and local media clocks 138 and 104, so that the modulo operator generates the phase difference 514.

The combination of the comparator 506 and the adjustment direction component 508 may determine the adjustment direction 520. The adjustment direction 520 may be useful because the process of synchronization may be faster if the phase of the local media clock 104 is shifted in one direction than the other.

The hysteresis component 512 may set the synchronized flag 226 from the phase adjust value 224. The synchronization adjustment module 210 may receive the synchronized flag 226 and the phase adjust value 224 from the synchronization calculation module 208. The synchronization adjustment module 210 may receive the syntonized flag 220 from the syntonization calculation module 204 or another module.

If the synchronized flag 226 indicates that the master and local media clocks 138 and 104 are not synchronized and the syntonized flag 22 indicates the clocks are syntonized, then the synchronization adjustment module 210 may determine the phase adjustment 228, and transmit the phase adjustment 228 to the frequency synthesizer 212. The phase adder 522 may increment the phase adjustment 228 by the phase adjust value 224. Alternatively, the synchronization adjustment module 210 may transmit the phase adjust value 224 to the frequency synthesizer 212.

Figure 6:
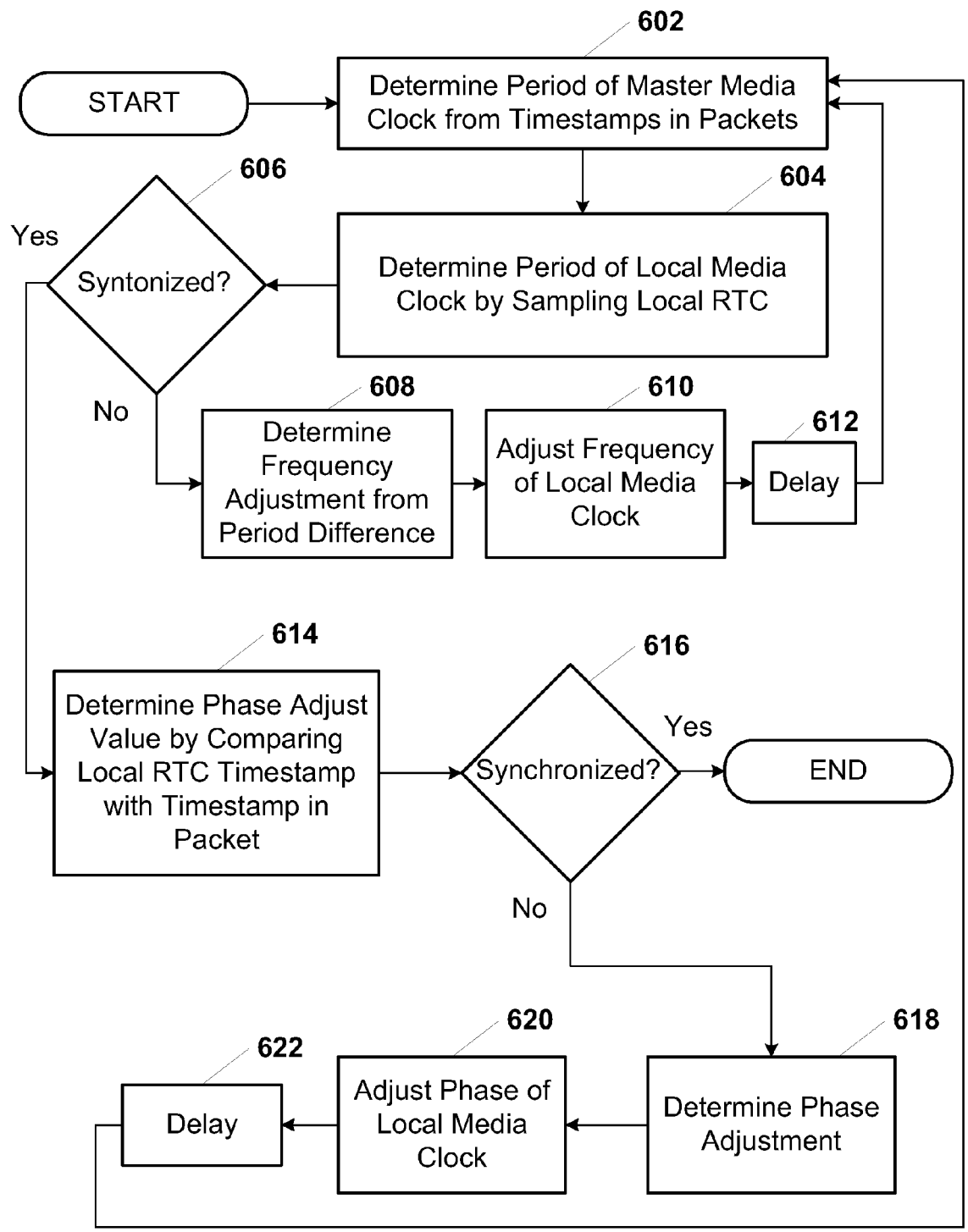
FIG. 6 illustrates a flow diagram of the operation of a media clock recovery module.

FIG. 6 illustrates a flow diagram of the operation of an example of the MCR module 102. The operation of the MCR module 102 may include more, fewer, or different operations than illustrated in FIG. 6. The operations may be executed in an order different than is illustrated in FIG. 6.

The period of the master media clock 138 may be determined from the timestamps 110 in the time-stamped packets 108 (602). The period determination module 202 may determine the master period 214 by repeatedly determining the difference between each successive one of the timestamps 110 in the time-stamped packets 108.

The period of the local media clock 104 may be determined by sampling the local RTC 116 (604). The period determination module 202 may determine the local period 216 by repeatedly reading the local RTC timestamp 232 from the local RTC 116 on the rising edge of the local media clock 104 and determining the difference between each successive one of the local RTC timestamps 232. Although the period of the master media clock 138 is determined before the period of the local media clock 104 in the example illustrated in FIG. 6, the order may be reversed or the periods may be determined at substantially the same time in other examples.

A determination may be made whether the master media clock 138 and the local media clock 104 are syntonized (606). The syntonization calculation module 204 may compare the period difference 218 between the master period 214 and the local period 216 with a threshold value. If the master media clock 138 and the local media clock 104 are not syntonized, then the frequency adjustment 222 may be determined from the period difference 218 (608). The frequency of the local media clock 104 may be adjusted accordingly (610). The syntonization adjustment module 206 may determine the frequency adjustment 222 and transmit the frequency adjustment 222 to the frequency synthesizer 212. The frequency synthesizer 212 may adjust the frequency of the local media clock 104 accordingly. The operation may repeat by returning to the operation where the period of the master media clock 138 is determined (602). Alternatively or in addition, the operation may delay (612) prior to beginning again.

Alternatively, if the master media clock 138 and the local media clock 104 are syntonized, then the phase adjust value 224 may be determined (614). A determination may be made whether the master media clock 138 and the local media clock 104 are synchronized from the phase adjust value 224 (616). For example, the synchronization calculation module 208 may determine the phase adjust value 224 and set the synchronization flag 226 accordingly.

If the synchronization flag 226 indicates that the master media clock 138 and the local media clock 104 are synchronized, then the operation may end. In one example, the operation may end by beginning again at the operation where the period of the master media clock 138 is determined from the timestamps 110 in the time-stamped packets 108 (602). Alternatively or in addition, the operation may delay prior to beginning again at the operation where the period of the master media clock 138 is determined from the timestamps 110 in the time-stamped packets 108 (602). In a second example, the operation may continue to generate the local media clock 104 without further modification of the local media clock 104.

Alternatively, if the synchronization flag 226 indicates that the master media clock 138 and the local media clock 104 are not synchronized, then the phase adjustment 228 may be determined (618). The phase of the local media clock 104 may be adjusted based on the phase adjustment 228 (620). The synchronization adjustment module 210 may determine the phase adjustment 228 and transmit the phase adjustment 228 to the frequency synthesizer 212. The frequency synthesizer 212 may adjust the phase of the local media clock 104 accordingly. In one example, the operation may begin again by returning to the operation where the period of the master media clock 138 is determined from the timestamps 110 in the time-stamped packets 108 (602). Alternatively or in addition, the operation may continue by delaying (622) before returning to the operation where the period of the master media clock 138 is determined from the timestamps 110 in the time-stamped packets 108 (602). In a second example, the master and the local clocks 138 and 104 may be assumed to still be syntonized, and the operation returns to where the phase adjust value 224 is determined (614).

Figure 7:
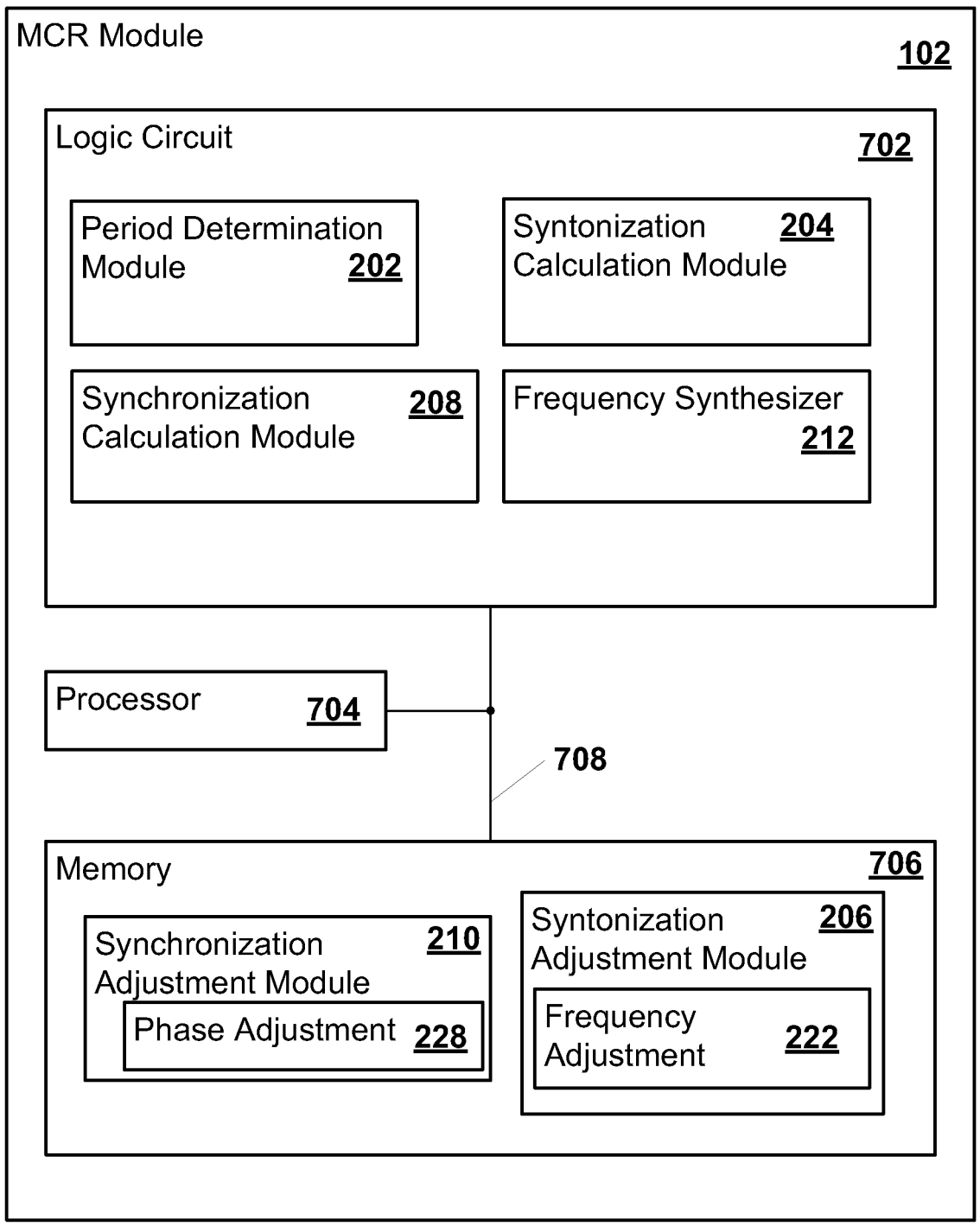
FIG. 7 illustrates a hardware diagram of the media clock recovery module.

FIG. 7 illustrates an example of a hardware diagram of the MCR module 102. The MCR module 102 may include a logic circuit 702, a processor 704, and a memory 706. The processor 704 may be in communication with the logic circuit 702 and the memory 706 over a bus 708.

Alternatively, the MCR module 102 may include more, fewer, or different components. For example, the logic circuit 702 may include the processor 704 and the memory 706. In one example, the entire MCR module 102 may be included in the logic circuit 702. The logic circuit 702 may be a field programmable gate array (FPGA), the bus 708 may be a processor local bus (PLB), and the processor 704 may be a soft core processor, such as MicroBlaze designed for Xilinx FPGAs from Xilinx™, a registered trademark of Xilinx, Inc of San Jose, Calif. The receiver 106 and the MCR module 102 may be implemented in the logic circuit 702. The MCR module 102 may be implemented partially or completely in an FPGA, an application-specific integrated circuit (ASIC), a complex programmable logic device (CPLD), or any other discrete physical component. In a second example, the memory 706 may include all of the components of the MCR module 102 other than the processor 704 and the frequency synthesizer 212.

The logic circuit 702 may include any hardware and/or software device, such as an integrated circuit, discrete physical components, or any combination thereof. The logic circuit 702 may include an FPGA, an application-specific integrated circuit (ASIC), a complex programmable logic device (CPLD), off-the self components, or any combination thereof. The logic circuit 702 may be a circuit generated from a hardware description language (HDL), such as Verilog HDL. The logic circuit 702 may include an implementation of the period determination module 202, the syntonization calculation module 204, the synchronization calculation module 208, the frequency synthesizer 212, or any other part the MCR module 102 or the receiver 106.

The memory 706 may be a data storage device or combination of data storage devices. The memory 706 may include non-volatile and/or volatile memory, such as a random access memory (RAM), a read-only memory (ROM), an erasable programmable read-only memory (EPROM), flash memory, any other type of computer readable media, or any combination thereof. Alternatively or in addition, the memory 706 may include an optical, magnetic (hard-drive) or any other form of data storage device. The memory 706 may be included in the logic circuit 702.

The processor 704 may be any hardware component that executes computer readable instructions. For example, the processor 704 may be a microcontroller, a soft core processor, an ASIC (application-specific integrated circuit), an FPGA (field programmable gate array), a CPLD (complex programmable logic device), a central processing unit of a computing device, a general processor, a digital signal processor, a digital circuit, an analog circuit, or any combination thereof.

The memory 706 may include computer code. The computer code may include instructions executable with the processor 704. The computer code may be written in any computer language now known or later discovered, such as C++, C#, Java, Pascal, Visual Basic, Perl, HyperText Markup Language (HTML), JavaScript, assembly language, and any combination of computer languages. The computer code may include source code and/or compiled code.

The memory 706 may store program logic that implements the synchronization adjustment module 210, the syntonization adjustment module 206, or any other part of the MCR module 102 other than the frequency synthesizer 212. For example, the memory 706 may store program logic that implements the scale adjustment module 314 in the period determination module 202. In one example, the memory 706 may include program logic that implements the period determination module 202, the syntonization calculation module 204, and the synchronization calculation module 208.

The bus 708 may be an interface that transfers data between components. The components may include the logic circuit 702, the processor 704, the memory 706, or any other device. The bus 708 may include a data bus internal to a computing device, a parallel bus, a serial bus, a PLB (Processor Local Bus), or any other tangible medium for transferring data between components.

The AVPM system 100, including the MCR module 102 in particular, may be implemented in many different ways. For example, although some features are shown stored in the computer-readable memory 706 (e.g., as logic implemented as computer-executable instructions or as data structures in memory), all or part of the AVPM system 100 or the MCR module 102, other than the frequency synthesizer 212, may be stored on, distributed across, or read from the memory 706 or some other machine-readable media. The computer-readable media may include RAM, an optical storage device, a magnetic storage device, a hard disk, a floppy disk, a CD-ROM, a solid state memory device, or any other form of tangible storage device. Alternatively or in addition, all or part of the AVPM system 100 and the MCR module 102 may be implemented in the logic circuit 702.

The processing capability of the AVPM system 100 and the MCR module 102 may be distributed among multiple entity or nodes, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that calculates the frequency adjustment 222. As another example, the DLL may itself provide a portion of the functionality of the AVPM system 100, MCR module 102, or both. The processor 704 may be in communication with the memory 706 and the logic circuit 702. The processor 704 may also be in communication with additional elements, such as a network interface configured to send and receive data over the network 122.

The processor 704 may be one or more devices operable to execute computer executable instructions or computer code embodied in the memory 706 or in other memory in order to perform the features of the MCR module 102, the receiver 106, or any combination thereof. The syntonization adjustment module 206, when executed by the processor 704, may read the period difference 218 and syntonized flag 220 from the syntonization calculation module 204 over the bus 708. The syntonization adjustment module 206 may also transmit the frequency adjustment 222 to the frequency synthesizer 212 over the bus 708. Alternatively or in addition, the synchronous adjustment module 210, when executed by the processor 704, may read the synchronized flag 226 and the phase adjust value 224 from the synchronization calculation module 208 over the bus 708. The synchronous adjustment module 210 may also transmit the phase adjustment 228 to the frequency synthesizer 212 over the bus 708.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, tables, entities, and other data structures may be separately stored and managed, may be incorporated into a single memory or database, may be distributed, or may be logically and physically organized in many different ways. The components, other than the frequency synthesizer 212, may be non-transitory computer readable media encoded with computer readable instructions. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors. For example, the syntonization calculation module 204 may be separated into multiple components, and the synchronization calculation module 208 may include the synchronization adjustment module 210.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described above may be executed in response to one or more sets of logic or instructions stored in or on computer readable media. The functions, acts or tasks are independent of the particular type of instructions set, storage media, processor or processing strategy, and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

The term "audio/video" may mean audio, video, or both. Thus, in one example, "audio/video" means only audio. In a second example, "audio/video" means only video. In a third example, "audio/video" means a combination of audio and video.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A system for recovering a local media clock from a master media clock based on a plurality of time-stamped packets received from a transmitter, the system comprising:
   a frequency synthesizer configured to generate the local media clock;
   a local real-time counter synchronized with a remote real-time counter associated with the transmitter;
   a period determination module configured to determine a period of the local media clock from a change in the local real-time counter over at least one cycle of the local media clock, and to determine a period of the master media clock from a difference between a first timestamp and a second timestamp, a first one of the time-stamped packets including the first timestamp and a second one of the time-stamped packets including the second timestamp;
   a syntonization adjustment module configured to cause the frequency synthesizer to adjust a frequency of the local media clock to match a frequency of the master media clock based on a difference between the period of the local media clock and the period of the master media clock; and a synchronization adjustment module configured to determine a phase difference between the master media clock and the local media clock, where the synchronization adjustment module is further configured to cause the frequency synthesizer to limit the phase difference between the master media clock and the local media clock in response to a determination that the local media clock is syntonized with the master media clock.

2. The system of claim 1 where the synchronization adjustment module is configured to cause the frequency synthesizer to adjust the phase of the local media clock to match the phase of the master media clock based on a difference between the second timestamp and a value read from the local real-time counter when the synchronization adjustment module reads the second timestamp included in the second one of the time-stamped packets.

3. The system of claim 1, where each of the first one and the second one of the timestamps is determined at the transmitter from a value of the remote real-time counter sampled on an edge of the master media clock.

4. The system of claim 1, where the local real-time counter is synchronized with the remote real-time counter through a clock synchronization protocol.

5. The system of claim 1, where the period determination module includes a finite impulse response filter to process timestamp differences in the time-stamped packets.

6. The system of claim 1 further comprising a syntonization calculation module configured to determine the difference between the period of the local media clock with a proportional integral derivative controller.

7. The system of claim 6, where the syntonization calculation module includes an averager component configured to average an output of the proportional integral derivative controller.

8. An apparatus for recovering a local media clock from a master media clock based on a plurality of time-stamped packets received at the apparatus from a transmitter, the apparatus comprising:

a frequency synthesizer that generates the local media clock;

a local real-time counter synchronized with a remote real-time counter at the transmitter;

a period determination module configured to determine a period of the local media clock from a change in the local real-time counter over at least one cycle of the local media clock, and to determine a period of the master media clock from a difference between at least a first timestamp and a second timestamp in the time-stamped packets, where each of the first and second timestamps is based on a value of the remote real-time counter sampled according to the master media clock at the transmitter;

a syntonization adjustment module configured to cause the frequency synthesizer to adjust the period of the local media clock to match the period of the master media clock; and a synchronization adjustment module configured to determine a phase difference between the master media clock and the local media clock, where the synchronization adjustment module is further configured to cause the frequency synthesizer to limit the phase difference between the master media clock and the local media clock in response to a determination that the local media clock is syntonized with the master media clock.

9. The apparatus of claim 8, where the synchronization adjustment module is configured to direct the frequency synthesizer to adjust the phase of the local media clock to match the phase of the master media clock based on a difference between a third timestamp in a third one of the time-stamped packets and a value read from the local real-time counter.

10. The apparatus of claim 8, where the synchronization adjustment module determines whether the local media clock is in a locked state from a comparison of a lock threshold with a phase difference between the local media clock and the master media clock.

11. The apparatus of claim 10, where the synchronization adjustment module decreases a phase adjust value in response to being in the locked state and increases the phase adjust value in response to not being in the locked state.

12. The apparatus of claim 8 comprising a first media clock recovery component and a second media clock recovery component, where the first media clock recovery component comprises the frequency synthesizer, the local real-time counter, and the period determination module, and where the second media clock recovery component comprises a second frequency synthesizer, a second local real-time counter, and a second period determination module for recovery of a second local media clock from a second master media clock.

13. The apparatus of claim 12, where the syntonization adjustment module reads the difference between the period of the first local media clock and the period of the first master media clock from the first media clock recovery component, where the syntonization adjustment module reads the difference between a period of the second local media clock and a period of the second master media clock from the second media clock recovery component, and where the syntonization adjustment module causes the first frequency synthesizer and the second frequency synthesizer to adjust the period of the first master media clock and the second master media clock, respectively.

14. The apparatus of claim 12, where the first local media clock recovery is for media streams in a first time domain and the second local media clock recovery is for media streams in a second time domain.

15. A method that generates a local media clock at a receiver from a plurality of time-stamped packets received from a transmitter, the method comprising:

providing a first real-time counter at the receiver, where the first real-time counter is synchronized with a second real-time counter at the transmitter;

generating the local media clock with a frequency synthesizer;

reading a plurality of first timestamps from the first real-time counter at a first rate determined by the local media clock;

determining a period of the local media clock at the receiver based on a change in the first timestamps;

determining a period of the master media clock in the transmitter based on a change in a plurality of second timestamps included in the time-stamped packets, the second timestamps being generated from a second real-time counter at the transmitter sampled at a second rate determined by the master media clock; adjusting a frequency of the local media clock with the frequency synthesizer to limit a difference between the period of the local media clock and the period of the master media clock;

determining a phase difference between the master media clock and the local media clock by comparing at least one timestamp in the time-stamped packets with at least one timestamp read from the first real-time counter; and adjusting a phase of the local media clock with the frequency synthesizer to limit the phase difference between the master media clock and the local media clock in response to determining the local media clock is syntonized with the master media clock.

16. The method of claim 15 where determining the period of the master media clock comprises dividing the change in the second timestamps included in the time-stamped packets by a number of data blocks in each of the time-stamped packets.

17. The method of claim 15 where determining the period of the master media clock further comprises filtering a plurality of changes in the second timestamps with a finite impulse response filter.

18. The method of claim 15 further comprising determining the difference between the period of the master media clock and the period of the local media clock by repeatedly determining the difference between the period of the master media clock and the period of the local media clock and aggregating the differences with a proportional integral derivative controller.

* * * * *